(12) United States Patent
Sato et al.

(10) Patent No.: US 7,532,776 B2
(45) Date of Patent: May 12, 2009

(54) OPTICAL ELEMENT AND OPTICAL SWITCH (75) Inventors: Keisuke Sato, Kawasaki (JP); Masao Kondo, Kawasaki (JP); Masatoshi Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/062,581

(22) Filed: Feb. 23, 2005

(65) Prior Publication Data
US 2006/0115198 A1 Jun. 1, 2006

(30) Foreign Application Priority Data
Nov. 26, 2004 (JP) ............................. 2004-343162

(51) Int. Cl.
G02F 1/035 (2006.01)
G02F 1/295 (2006.01)
G02B 6/26 (2006.01)
G02B 6/34 (2006.01)

(52) U.S. Cl. ................. 385/2; 385/3; 385/8; 385/9; 385/10; 385/16

(58) Field of Classification Search ........... 385/1–3, 385/8–10
See application file for complete search history.

(56) References Cited
U.S. PATENT DOCUMENTS
5,506,925 A * 4/1996 Greene et al. ............... 385/129

| 5,802,223 | A | 9/1998 | Nashimoto | 385/8 |
| 6,078,717 | A | 6/2000 | Nashimoto et al. | 385/130 |
| 6,778,726 | B2 * | 8/2004 | Kato et al. | 385/16 |
| 6,823,097 | B2 | 11/2004 | Glebov et al. | 385/16 |
| 2003/0223692 | A1 * | 12/2003 | Ikarashi et al. | 385/38 |
| 2005/0286851 | A1 * | 12/2005 | Liu et al. | 385/129 |

FOREIGN PATENT DOCUMENTS
JP 2-204728 8/1990
JP 03-216622 9/1991
JP 2003-280053 10/2003

OTHER PUBLICATIONS

"Extended Abstracts: (The 65th Autumn Meeting, 2004); The Japan Society of Applied Physics"; *JSAP Catalog* No. AP 041136-02; Sep. 1, 2004; p. 493.

Kim, Dal-Young et al.: "Random exchange-type electro-optic behavior of $Pb_{0.865}La_{0.09}(Zr_{0.65}Ti_{0.35})O_3$ relaxor ferroelectrics," *Applied Physics Letters*, vol. 81, No. 4, Jul. 22, 2002, pp. 706-708.

* cited by examiner

*Primary Examiner*—Michelle R Connelly Cushwa
(74) *Attorney, Agent, or Firm*—Kratz, Quintos & Hanson, LLP (57) ABSTRACT

A core layer of an optical waveguide is grown as a film comprised of an electro-optic material with a rhombohedral structure and grown above a substrate with (100) crystal orientation on a major face.

5 Claims, 9 Drawing Sheets

OPTICAL ELEMENT AND OPTICAL SWITCH

CROSS-REFERENCE TO RELATED APPLICATIONS

This application is based upon and claims the benefit of priority from the prior Japanese Patent Application No. 2004-343162, filed on Nov. 26, 2004, the entire contents of which are incorporated herein by reference.

BACKGROUND OF THE INVENTION

1. Field of the Invention

The present invention relates to an optical element and an optical switch used in a technical field of optical communication, optical signal processing, and the like.

2. Description of the Related Art

In recent years, transmission bands in optical communication are rapidly increasing, and in accordance with the progress of a wavelength multiplexing technology, higher speed and higher capacity are being promoted. In order to configure a hardware infrastructure of optical fiber networks in core communication networks, an optical signal switching device for switching transmission destinations of an optical signal is required. This switching device has to be usable in a single-mode optical fiber. For this purpose, it is necessary to switch the directions of light not depending on polarization of a TE mode and a TM mode which are polarization directions of light. In order to respond to this requirement, a mechanical drive type such as a so-called MEMS (Micro Electro Mechanical Systems) that switches the directions of light by moving a microscopic mirror and a thermooptic type that changes a refractive index by heating to change travel directions of light, and the like have been developed.

However, the mechanical drive type and the thermo-drive type have problems that the time required for switching transmission destinations of an optical signal is of millisecond (msec) order, which is relatively long, and that the maximum switching speed is low. Speed in networks is further accelerated, and there has been a strong demand for a high-speed optical switching device.

Therefore, as a method of changing a refractive index at high speed, a method utilizing an electro-optic effect (electro-optic effect based method) is available. The use of this electro-optic effect based method makes it possible to change the refractive index in an extremely short time, namely, of an order of nanosecond (nsec) to microsecond (μsec), so that an optical switching device driven at an extremely high speed is realized.

[Patent document 1] Japanese Patent Application Laid-open No. Hei 3-216622

[Patent document 2] Japanese Patent Application Laid-open No. Hei 2-204728

[Patent document 3] Japanese Patent Application Laid-open No. 2003-280053

[Non-patent document 1] The 65th Autumn Meeting 2004 (The Japan Society of Applied Physics), Preliminary Papers p 493

The electro-optic effect based method realizes a high-speed driven optical switching device. However, generally, an electro-optic effect cannot greatly change a refractive index of TE mode light not having an electric field component in a propagation direction of light though capable of greatly changing a refractive index of TM mode light not having a magnetic field component in a propagation direction of light. Thus, changes in refractive index greatly differ between the TM mode and the TE mode. Therefore, in order to correct this difference, the following various technologies have been proposed.

The patent document 1 discloses an art using an electro-optic effect film in which an angle of an axis perpendicular to a (001) face relative to a perpendicular line of a substrate surface is set to larger than 0° and not larger than 45°. Further, the patent document 2 discloses an art of providing, at a predetermined portion of an optical waveguide, a static phase control part that gives a static phase change to waveguide light without any dependency on an electro-optic effect. The patent document 3 discloses an art in which light deflecting parts are provided respectively at one end and the other end of a waveguide having an electro-optic effect, a ½ wave plate is disposed at a substantially center of each of the light deflecting parts, and the ½ wave plates replace a TM mode component and a TE mode component of light with each other.

However, it cannot be said that the art disclosed in the patent document 1 easily realizes accurate formation of an electro-optic effect film satisfying strict and complicated conditions described above. Further, in the arts disclosed in the patent documents 2, 3, it is essential to additionally provide members such as the static phase control part or the ½ wave plates in the optical waveguide, which poses a problem of complicating a device structure and increasing optical loss.

Thus, an electro-optic effect based method, though enabling quicker driving of an optical switching device, currently has a significant problem that it is difficult to realize a device and that the device structure is necessarily complicated and is difficult to be downsized.

SUMMARY OF THE INVENTION

The present invention is made in consideration of the problems stated above, and it is an object of the present invention to provide an optical element that utilizes an electro-optic effect to easily and surely achieve high-speed driving, with an extremely simple structure and without any characteristic deterioration such as optical loss and that can realize further downsizing, and to provide an optical switch to which this optical element is applied.

An optical element of the present invention includes: a substrate; and at least one layer of an electro-optic effect film formed above the substrate and having an electro-optic effect, wherein the electro-optic effect film has at least one polarization axis, and all the polarization axes are the same to a TE mode component of incident light and are the same to a TM mode component of the incident light.

Here, in some cases, the electro-optic effect film has domains of at least one kind, and all the polarization axes of the domains are the same to the TE mode component of the incident light and are the same to the TM mode component of the incident light.

Another optical element of the present invention includes: a substrate; and at least one layer of an electro-optic effect film formed above the substrate and having an electro-optic effect, wherein the electro-optic effect film is comprised of an electro-optic material with a cubic crystal structure.

An optical switch of the present invention includes: an optical waveguide including at least one layer of an electro-optic effect film; a plurality of input channels formed in parallel at one end on the optical waveguide to receive an optical signal; first light deflectors provided for the respective input channels; a plurality of output channels formed in parallel at the other end on the optical waveguide to output the optical signal; and second light deflectors provided for the respective output channels, wherein the electro-optic effect film has at least one polarization axis and all the polarization axes are the same to a TE mode component of incident light and are the same to a TM mode component of the incident light.

Here, in some cases, the electro-optic effect film has domains of at least one kind, and all the polarization axes of the domains are the same to the TE mode component of incident light and are the same to the TM mode component of the incident light.

Another optical switch of the present invention includes: an optical waveguide including at least one layer of an electro-optic effect film; a plurality of input channels formed in parallel at one end on the optical waveguide to receive an optical signal; first light deflectors provided for the respective input channels; a plurality of output channels formed in parallel at the other end on the optical waveguide to output the optical signal; and second light deflectors provided for the respective output channels, wherein the electro-optic effect film is comprised of an electro-optic material with a cubic crystal structure.

DETAILED DESCRIPTION OF THE PREFERRED EMBODIMENTS

Basic Gist of Present Invention

As a result of repeated assiduous studies for solving the aforesaid problems, the present inventors have found a method of making a refractive index and an electro-optic effect substantially polarization independent with an extremely simple configuration, and have reached an optical element requiring no additional members such as a wave plate and a static phase control part, and an optical switch to which this optical element is applied.

First, an electro-optic constant will be defined below. Assuming that an electric field E is applied in parallel with a TM-Mode of light propagating in a crystal. Changes in refractive indexes of the TE-Mode and a TM-Mode at this time are represented by expressions (1), (2) respectively.

$$\Delta n_{TE} = -(1/2) n_{TE}^3 r_{13} E \quad (1)$$

$$\Delta n_{TM} = -(1/2) n_{TM}^3 r_{33} E \quad (2)$$

Here, $n_{TE}$ and $n_{TM}$ represent the refractive indexes of the TE-Mode and the TM-Mode, and $r_{13}$ and $r_{33}$ represent electro-optic constants thereof, respectively. A variation amount $\Delta n$ of the refractive index is proportional to intensity of the electric field, an electro-optic constant, and $n^3$. The larger the electro-optic effect is, at the larger angle can light be deflected with a low voltage. Therefore, a material high in electro-optic constant and in refractive index is being demanded. An electro-optic effect $r_c$ generally used as a characteristic of a bulk electro-optic material or the like is represented by an expression (3).

$$r_c = r_{33} - (n_{TE}/n_{TM})^3 r_{13} \quad (3)$$

Figure 1A:
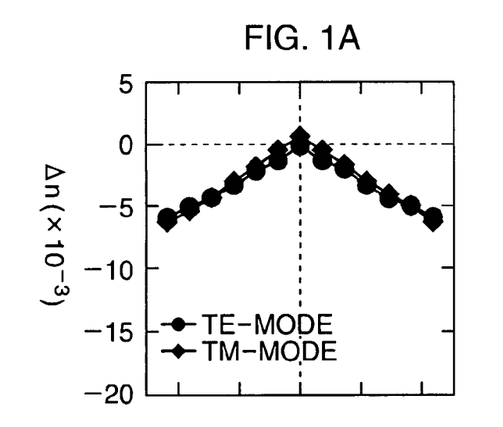
FIG. 1A to FIG. 1F are schematic charts showing crystal orientation dependency of an electro-optic effect film that is formed by epitaxial growth, with its material being PbLaZrTiO$_3$ (PLZT: 8/65/35) which is an electro-optic crystal.
Figure 1B:
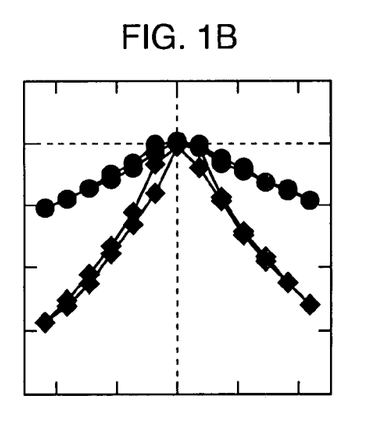
Figure 1C:
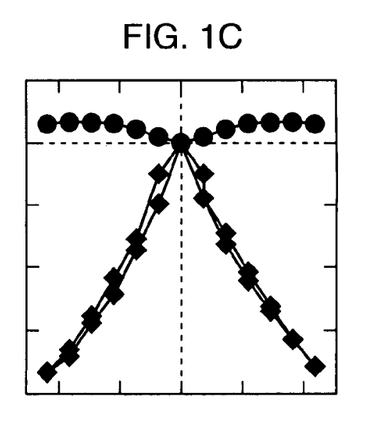
Figure 1D:
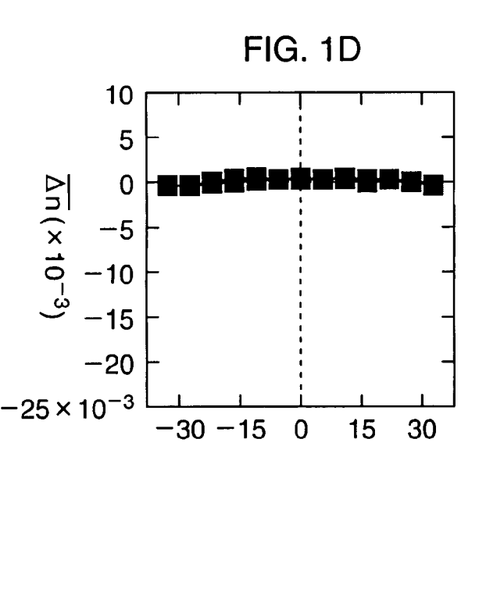
Figure 1E:
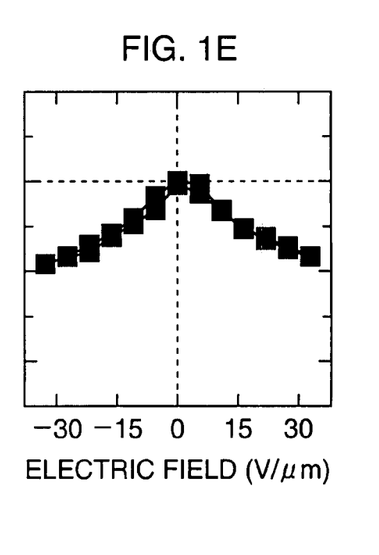

FIG. 1A to FIG. 1F are schematic views showing crystal orientation dependency of an electro-optic effect film formed by epitaxial growth, with its material being PbLaZrTiO$_3$ (PLZT: 8/65/35) which is an electro-optic crystal. Here, FIG. 1A, FIG. 1B, and FIG. 1C show crystal orientation dependency for respective orientations (100), (110), (111). FIG. 1D, FIG. 1E, and FIG. 1G show double refractive indexes defined by a difference in refractive index between the TM mode and the TE mode, similarly for the respective orientations (100), (110), (111).

First, it is seen from the result for (100) in FIG. 1A that the respective refractive indexes of the TM mode and the TE mode present the same change. The electro-optic constant is $r_{13}$, $r_{33} \approx 30$ pm/V. Therefore, even the application of an electric field does not cause double refraction, resulting in FIG. 1D. In this case, $r_c \approx 0$ pm/V.

Next, it is seen from the result for (110) in FIG. 1B that the refractive index of the TE mode presents substantially the same change as that of the refractive index of the TE mode in FIG. 1A. The electro-optic constant is $r_{13} \approx 30$ pm/V. In this case, however, the refractive index of the TM mode presents a slightly larger change resulting in $r_{33} \approx 70$ pm/V. The double refraction is caused as shown in FIG. 1E and $r_c \approx 40$ pm/V.

Figure 1F:
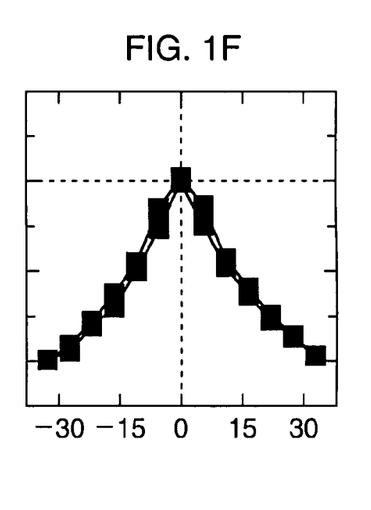

Next, it is seen from the result for (111) in FIG. 1C that the refractive index of the TE mode presents an incremental change. The electro-optic constant is $r_{33} \approx -10$ pm/V. On the other hand, the refractive index of the TM mode presents a large decremental change. The electro-optic constant is $r_{33} \approx 90$ pm/V. Therefore, a large double refraction is caused as shown in FIG. 1F, resulting in $r_c \approx 100$ pm/V.

As described above, it has been made clear that the electro-optic effect has or does not have polarization dependency depending on the crystal orientation in an electro-optic material. The present inventors have found out in a bulk electro-optic material that the polarization dependency of the electro-optic effect is caused by the rotation of domains of the electro-optic effect material (see the non-patent document 1). As a result of assiduous studies with the intention of applying this fact to a concrete electro-optic effect film, the present inventors have devised a polarization-independent electro-optic effect film with a simple structure, and in addition, have reached concretely typified various embodiments as follows.

A phenomenon that the electro-optic effect becomes polarization dependent depending on crystal orientation in an electro-optic material can be understood as follows.

PLZT (9/65/35) is known as a relaxor material and is thought to have microdomains peculiar to a relaxor material. The rotation of an index ellipsoid accompanying the rotation of the microdomains can account for the polarization dependency of the electro-optic effect. It is known that the microdomain of the relaxor material has a polarization axis in a <111> direction and takes a rhombohedral structure. Because of the rhombohedral structure, the index ellipsoid is a uniaxial crystal. Here, when an arrow is taken in the direction of the <111> polarization axis and a refractive index is represented by the length of this arrow, projections of the arrow to the TE mode and the TM mode are proportional to reciprocals of the respective refractive indexes thereof.

Figure 2A:
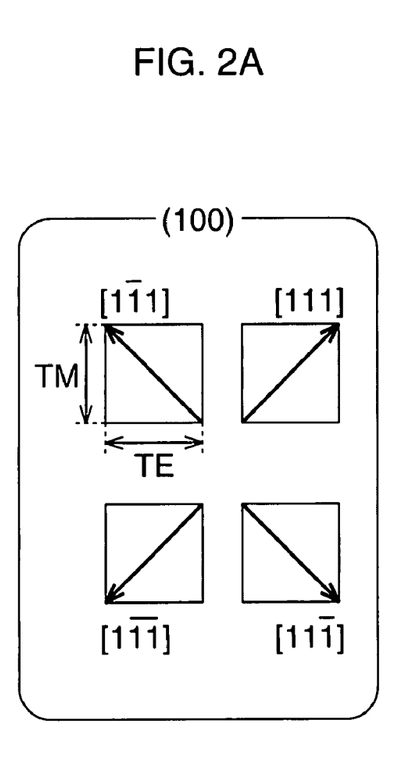
FIG. 2A, FIG. 2B, and FIG. 2C are schematic views showing an arrangement state of microdomains depending on each crystal orientation.
Figure 2B:
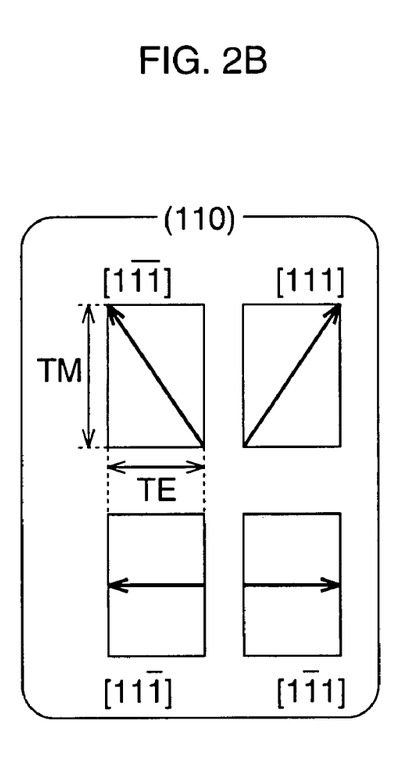
Figure 2C:
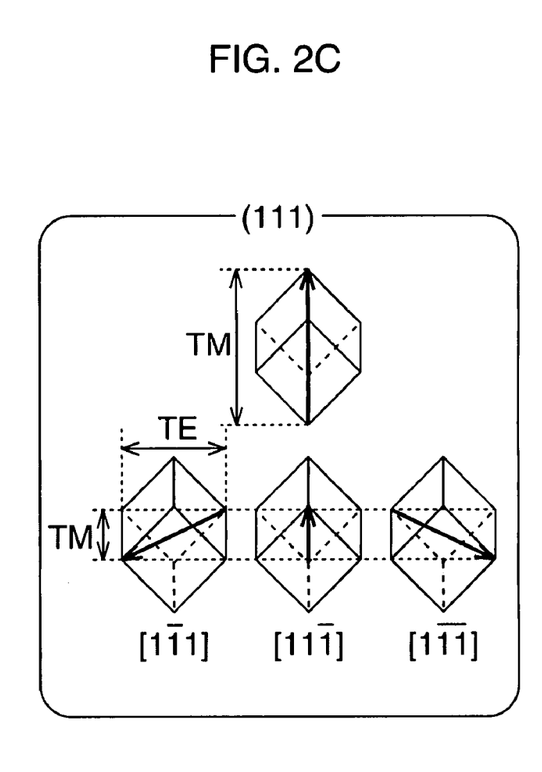

FIG. 2A, FIG. 2B, and FIG. 2C are schematic views showing the arrangement state of microdomains depending on each crystal orientation.

Here, FIG. 2A shows microdomains in an epitaxially grown electro-optic effect film with (100) crystal orientation, FIG. 2B shows microdomains in the same with (011) crystal orientation, and FIG. 2C shows microdomains in the same with (111) crystal orientation. Here, in FIG. 2A to FIG. 2C, a negative direction, namely, −1 is represented by overlined 1 as is practiced by those in the art, but in this specification, it is represented by 1̲ for descriptive convenience.

First, the epitaxially grown electro-optic effect film with the (100) crystal orientation will be studied. As shown in FIG. 2A, the microdomains presented [111], [111̲], [11̲1], and [1̲11]. As is seen from FIG. 2A, projections of the arrows to the TE mode and the TM mode have the same length in all the microdomains. Therefore, even the rotation of the microdomains would not cause a change in refractive indexes of the TE mode and the TM mode. Therefore, the double refraction caused by the rotation of the microdomains does not occur, resulting in $r_c$ of 0 pm/V.

Next, the epitaxially grown electro-optic effect film with the (110) crystal orientation will be studied. As shown in FIG. 2B, the microdomains presented [111], [11̲1], [111̲], and [1̲11]. The rotation of the microdomains between [111] and [1̲11] would not cause a change in refractive index. Similarly, the refractive index does not change in accordance with the rotation between [111̲] and [1̲11̲]. However, the rotation between [111] and [11̲1], though not causing a change in the refractive index of the TE mode, causes a change in the refractive index of the TM mode in accordance with the change in length of the arrow. The rotation from [111] to [11̲1] results in a smaller refractive index of the TM mode. This causes double refraction.

Next, the epitaxially grown electro-optic effect film with the (111) crystal orientation will be studied. As shown in FIG. 2C, the microdomains presented [111], [11̲1], [111̲], and [1̲11]. The rotation of the microdomains among [11̲1], [111̲], and [1̲11] does not cause a change in refractive index. However, the rotation of the domains from [11̲1] to [111] causes changes in refractive indexes of the TE mode and the TM mode. The refractive index of the TE mode becomes larger and the refractive index of the TM mode becomes smaller. This causes double refraction. Further, it is thought that the double refraction is larger than that of the epitaxially grown electro-optic effect film with the (110) crystal orientation, due to a larger variation amount in the length of the arrow. Therefore, it is thought that $r_{c(110)} < r_{c(111)}$. In the above-described manner, orientation dependency of the electro-optic effect $r_c$ can be accounted for.

Based on the foregoing studies, the present inventors have found the following several requisite conditions under which the electro-optic effect is polarization independent in an electro-optic effect film.

(1) A structure with no polarization axis. The structure with no polarization axis cannot cause double refraction.

(2) In a structure having at least one polarization axis, all the polarization axes are the same to a TE mode component of incident light and are the same to a TM mode component of incident light. Here, if there are two kinds or more of domains, it is necessary that all the polarization axes of the respective domains are the same to the TE mode component of incident light and are the same to the TM mode component of incident light. If all the polarization axes of the respective domains are the same to the TE mode component of incident light and are the same to the TM mode component of incident light, double refraction does not occur even if the rotation of the domains is caused by the application of voltage to the electro-optic effect film.

(3) A structure having domains of a single kind. If the domains are of only one kind, the rotation of the domains cannot occur, resulting in no double refraction. Therefore, all the polarization axes of the domains are naturally the same to the TE mode component of incident light and are the same to the TM mode component of incident light.

Satisfying any one of the above conditions (1) to (3) will realize an electro-optic effect film whose electro-optic effect is polarization independent. A specific conceivable structure easily realized is an electro-optic material with a cubic crystal structure as a structure satisfying the condition (1).

Further, an electro-optic effect film comprised of an electro-optic material presenting a rhombohedral structure and having (100) crystal orientation is an example of a structure satisfying the condition (2).

Further, an electro-optic material having domains of a single kind with a pseudo-cubic crystal structure is an example of a structure satisfying the condition (3).

As described above, the present invention proposes the following three structures as an electro-optic effect film.

1. a film comprised of an electro-optic material presenting a rhombohedral structure and grown to have (100) crystal orientation
2. a film having domains of a single kind and comprised of an electro-optic material with a pseudo-cubic crystal structure
3. a film comprised of an electro-optic material with a cubic crystal structure As will be described later, electro-optic effect films with these structures can be easily fabricated, and the use of these films realizes an optical element that utilizes an electro-optic effect to easily and surely achieve high-speed driving, with an extremely simple structure and without any characteristic deterioration such as optical loss and that can realize further downsizing. Also realized is an optical switch to which this optical element is applied.

Various Concrete Embodiments to Which Present Invention is Applied

Hereinafter, various concrete embodiments to which the present invention is applied will be detailed with reference to the drawings.

First Embodiment

This embodiment will disclose an example where the present invention is applied to a light deflector which is an optical element. The light deflector is an optical element that deflects incident light at a desired angle to output the deflected light.

Figure 3A:
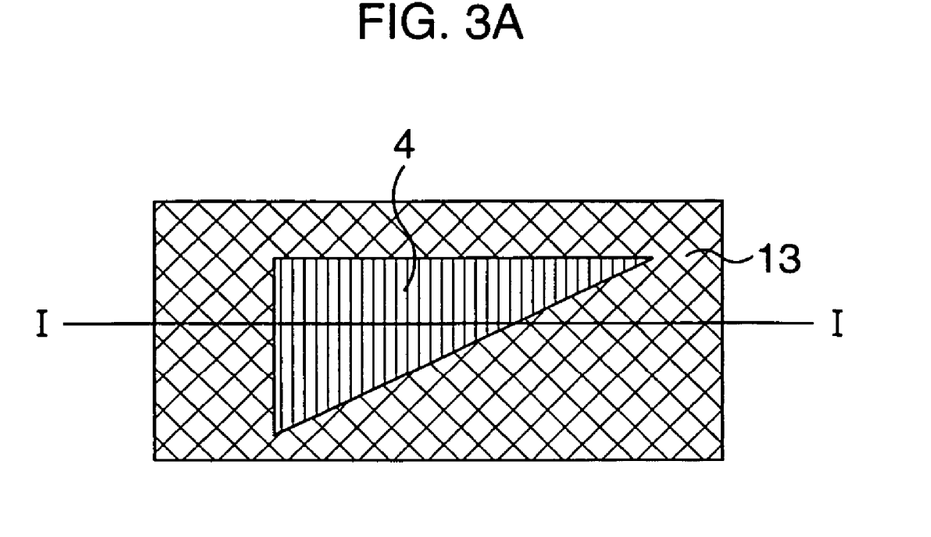
FIG. 3A and FIG. 3B are schematic views showing an essential structure of a light deflector according to a first embodiment.
Figure 3B:
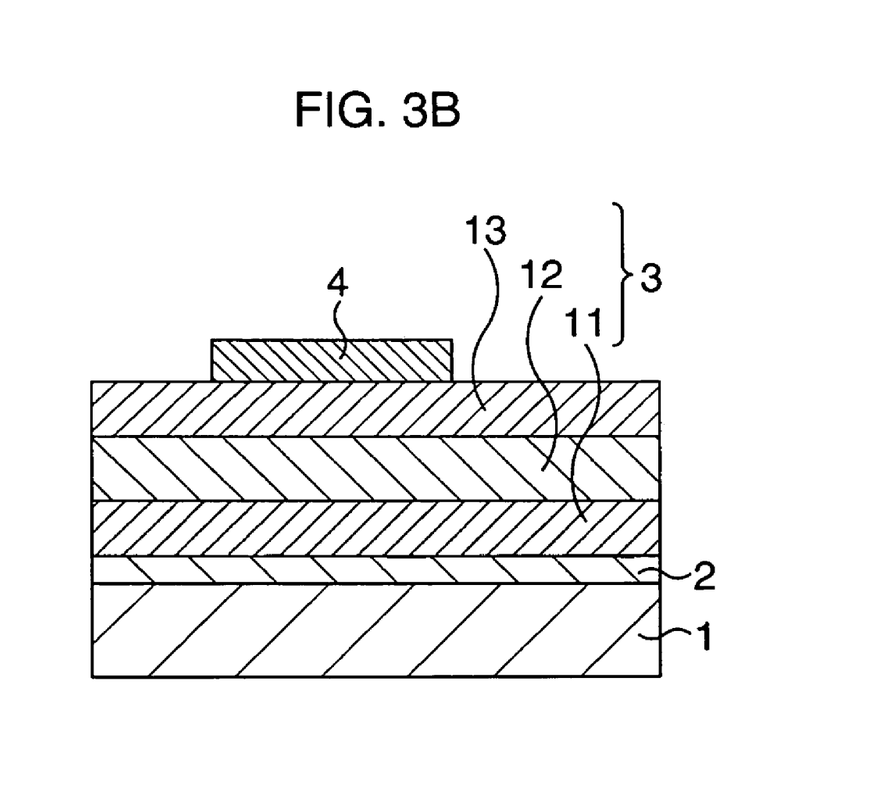

FIG. 3A and FIG. 3B are schematic views showing an essential structure of the light deflector according to the first embodiment. FIG. 3A is a plane view and FIG. 3B is a cross-sectional view taken along the I-I line in FIG. 3A.

This light deflector includes: a stress-relief layer 2 formed on a substrate 1; an optical waveguide 3 composed of electro-optic materials layered on the stress-relief layer 2; and a deflection electrode 4 provided on the optical waveguide 3 to face the stress-relief layer 2 via the optical waveguide 3.

The substrate 1 contains an insulative material, here $SrTiO_3$ (STO), as its major component. For example, the substrate 1 includes, as its material, STO containing 1% Nb, and have (100) crystal orientation on a major growth face.

The stress-relief layer 2 is comprised of a metal material whose major component is, for example, Ag or an alloy thereof and has a function of reliving stress to the optical waveguide 3 ascribable to the substrate 1. This stress-relief layer 2 is a high-conductivity metal material, so that it also functions as a lower electrode for use when voltage is applied to the optical waveguide 3. In a substrate containing STO with (100) crystal orientation on a major growth face, square (100) faces are arranged since STO is a cubic crystal. A rhombohedral PLZT unit cell has a rhombic bottom face. When rhombohedral PLZT is epitaxially grown directly on the (100) faces, orientation occurs also in the substrate surface, so that it is influenced by a substrate stress to be easily distorted to a tetragonal crystal having square/rectangular faces. Here, when the stress-relief layer 2 is provided between the substrate 1 and the optical waveguide 3, the stress-relief layer 2 relieves the substrate stress, so that a rhombohedral crystal, which is an original crystal system of PLZT, can be grown. The polarization direction of the rhombohedral crystal is a (111) face, and domains generated in the film are of a single kind, so that polarization dependency of waveguide light can be reduced.

The optical waveguide 3, which is a so-called slab waveguide, is formed of a stack of two layers or more, here, three layers of electro-optic effect films. Specifically, the optical waveguide 3 is structured such that a lower clad layer 11 and an upper clad layer 13 sandwich a core layer 12 in which an optical path is formed.

In this embodiment, a layer including at least the core layer 12 of the optical waveguide 3 is formed to satisfy one of the following conditions 1 to 3, which are described above.

1. a film comprised of an electro-optic material with a rhombohedral structure and grown to have the (100) crystal orientation
2. a film having domains of a single kind and comprised of an electro-optic material with a pseudo-cubic crystal structure
3. a film comprised of an electro-optic material with a cubic crystal structure An electro-optic material of the lower clad layer 11, the core layer 12, and the upper clad layer 13 which constitute the optical waveguide 3 preferably contains one kind selected from, for example, the following materials, each of which is a ferroelectric material superior in electro-optic effect and has, for example, a simple perovskite structure: $Pb(Zr_{1-x}Ti_x)O_3 (0 \leq x \leq 1)$, $(Pb_{1-y}La_{(3/2)y})(Zr_{1-x}Ti_x)O_3$ $(0 \leq x, y \leq 1)$, $Pb(B'_{1/3}B''_{2/3})_xTi_yZr_{1-x-y}O_3$ $(0 \leq x, y \leq 1$, B' is bivalent transitional metal, B" is pentavalent transitional metal), $Pb(B'_{1/2}B''_{1/2})_xTi_yZr_{1-x-y}O_3$ $(0 \leq x, y \leq 1$, B' is bivalent transitional metal, B" is pentavalent transitional metal), $Pb(B'_{1/3}B''_{2/3})_xTi_yZr_{1-x-y}O_3$ $(0 \leq x, y \leq 1$, B' is hexavalent transitional metal, B" is trivalent transitional metal), and $Ba(Fe_xNb_{1-x})O_3$ $(0 \leq x \leq 1)$, $(1-x)NaNbO_3 \cdot xKNbO_3$ $(0 \leq x \leq 1)$. Here, each of the electro-optic effect films of the optical waveguide 3 is an epitaxial film formed by epitaxial growth and has, for example, (100) crystal orientation on a major growth face.

Further, suitably used is an electro-optic material with a tungsten bronze structure containing one kind selected from, for example, $(Sr_{1-x}Ba_x)Nb_2O_6$ $(0 \leq x \leq 1)$, $(Sr_{1-x}Ba_x)Ta_2O_6$ $(0 \leq x \leq 1)$, $PbNb_2O_6$, and $Ba_2NaNb_5O_{15}$. Also suitably used is an electro-optic material with a bismuth-layered structure containing one kind selected from, for example, $(Bi_{1-x}R_x)Ti_3O_{12}$ (R is a rare-earth element: $0 \leq x \leq 1$), $SrBi_2Ta_2O_9$, and $SrBi_4Ti_4O_{15}$.

The deflection electrode 4 is formed in, for example, a triangular shape on the optical waveguide 3, and it has a function of deflecting incident light at a desired angle to output the deflected light when a predetermined voltage is applied between the deflection electrode 4 and the stress-relief layer 2.

Here, a manufacturing method of the light deflector according to this embodiment will be described.

Figure 4A:
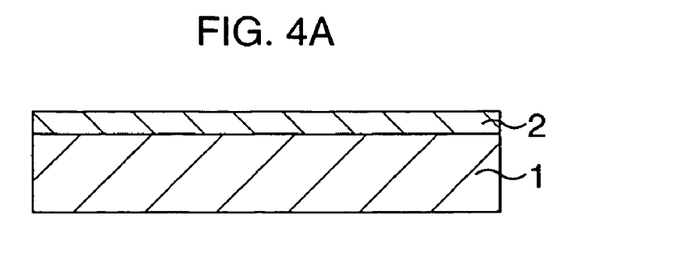
FIG. 4A, FIG. 4B, and FIG. 4C are schematic cross-sectional views showing a manufacturing method of the light deflector according to the first embodiment, in the order of processes.
Figure 4B:
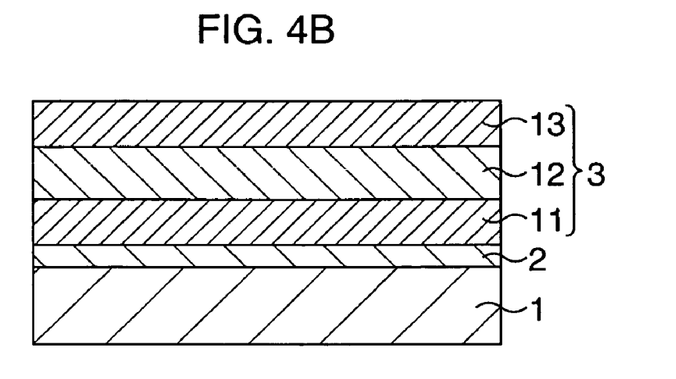
Figure 4C:
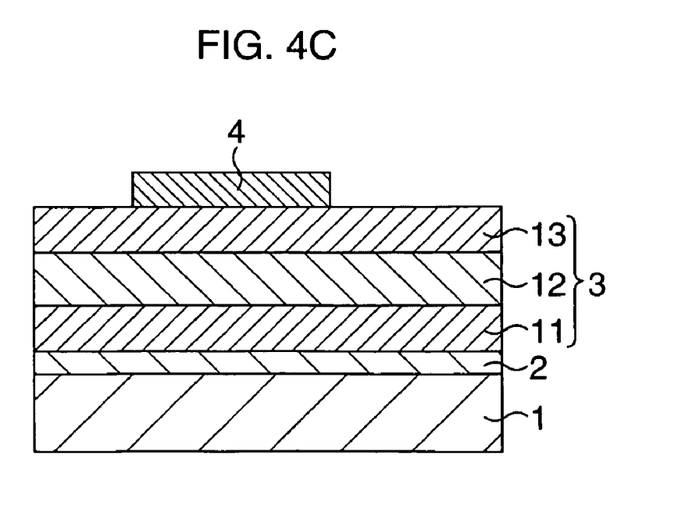

FIG. 4A, FIG. 4B, and FIG. 4C are schematic cross-sectional views showing the manufacturing method of the light deflector according to the first embodiment, in the order of processes.

First, the stress-relief layer 2 is formed on the substrate 1.

Specifically, as shown in FIG. 4A, a metal material whose major component is, for example, Ag or an alloy thereof is deposited by sputtering on the substrate 1 with (100) crystal orientation on a major growth surface, comprised of Nb1%-STO, thereby forming the stress-relief layer 2 with a film thickness of about 100 nm.

Subsequently, the optical waveguide 3 is formed on the stress-relief layer 2.

In this embodiment, the lower clad layer 11, the core layer 12, and the upper clad layer 13 are formed as shown in FIG. 4A to satisfy any one of the conditions 1 to 3 described above.

1. A case where the core layer 12 is formed as a film comprised of an electro-optic material with a rhombohedral structure and grown to have the (100) crystal orientation One of examples of a relaxor substance with the rhombohedral structure is a PZLT material. This substance is epitaxially grown on the substrate 1 with the (100) crystal orientation on the major growth surface, thereby forming an optical waveguide with (100) crystal orientation. Here, PLZT (13/70/30) with a 2.39 refractive index (1.55 μm wavelength) is used as a material of the lower clad layer 11. PLZT (9/65/35) with a 2.41 refractive index (1.55 μm wavelength) is used as a material of the core layer 12. PLZT (13/70/30) with a 2.40 refractive index (1.55 μm wavelength) is used as a material of the upper clad layer 13.

A sol-gel solution for PLZT is synthesized under reflux of organic compounds of constituent metal elements and a stabilizer by a solvent: the organic compounds being $Pb(CH_3COO)_2 \cdot 3H_2O$ [lead acetate], $La(i\text{-}OC_3H_7)_3$ [lanthanum isopropoxide], $Ti(i\text{-}OC_3H_7)_4$ [titanium isopropoxide], and $Zr(OC_3H_7)_4$ [zirconium propoxide]; the stabilizer being $CH_3COCH_2COCH_3$ [2,4-pentanedione]; and the solvent being $CH_3C_2H_4OH$ [2-methoxyethanol].

For forming the core layer 12 with the PLZT (9/65/35) composition, a mol ratio of $Pb(CH_3COO)_2 \cdot 3H_2O/La(i\text{-}OC_3H_7)_3$ is set to 101/9 and a mol ratio of $Zr(Oc_3H_7)_4/Ti(i\text{-}OC_3H_7)_4$ is set to 65/35. The substrate 1 is coated with this sol-gel solution by spin coating, and calcination at 350° C. and sintering at 750° C. are performed in an oxygen atmosphere. A film thickness growable per process is about 120 nm, and the coating, calcining, and sintering processes are repeated until a desired film thickness, here about 5 μm is obtained.

For forming the lower and upper clad layers 11, 13 with the PLZT (13/70/30) composition, a mol ratio of Pb(CH$_3$COO)$_2$.3H$_2$O/La(i-OC$_3$H$_7$)$_3$ is set to 97/13 and a mol ratio of Zr(OC$_3$H$_7$)$_4$/Ti(i-OC$_3$H$_7$)$_4$ is set to 70/30. The substrate 1 is coated with this sol-gel solution by spin coating, and calcination at 350° C. and sintering at 750° C. are performed in an oxygen atmosphere. The coating, calcining, and sintering processes are repeated until the upper clad layers 11, 13 both have a desired film thickness, here about 3 μm.

2. A case where the core layer 12 is formed as a film having domains of a single kind and comprised of an electro-optic material with a pseudo-cubic crystal structure As a material of the core layer 12, a PLZT (0/30/70) composition with a pseudo-cubic crystal structure slightly distorted to a tetragonal crystal is used. A method of preparing a sol-gel solution for PLZT is the same as that described above.

For forming the core layer 12 with the PLZT (0/30/70) composition, La (i-OC$_3$H$_7$)$_3$ is not used, that is, a mol ratio of Pb (CH$_3$COO)$_2$.3H$_2$O/La (i-OC$_3$H$_7$)$_3$ is set to 110/0 (100:0) and a mol ratio of Zr (Oc$_3$H$_7$)$_4$/Ti (i-OC$_3$H$_7$)$_4$ is set to 30/70. The substrate 1 is coated with this sol-gel solution by spin coating, calcination at 350° C. and sintering at 750° C. are performed in an oxygen atmosphere. The coating, calcining, and sintering processes are repeated until the core layer 12 has a desired film thickness, here about 5 μm.

For forming the lower and upper clad layers 11, 13 with the PLZT (9/65/35) composition, a mol ratio of Pb (CH$_3$COO)$_2$.3H$_2$O/La (i-OC$_3$H$_7$)$_3$ is set to 101/9 and a mol ratio of Zr (Oc$_3$H$_7$)$_4$/Ti(i-OC$_3$H$_7$)$_4$ is set to 65/35. The substrate 1 is coated with this sol-gel solution by spin coating, and calcination at 350° C. and sintering at 750° C. are performed in an oxygen atmosphere. The coating, calcining, and sintering processes are repeated until the lower and upper clad layers 11, 13 both have a desired film thickness, here about 3 μm.

Figure 5:
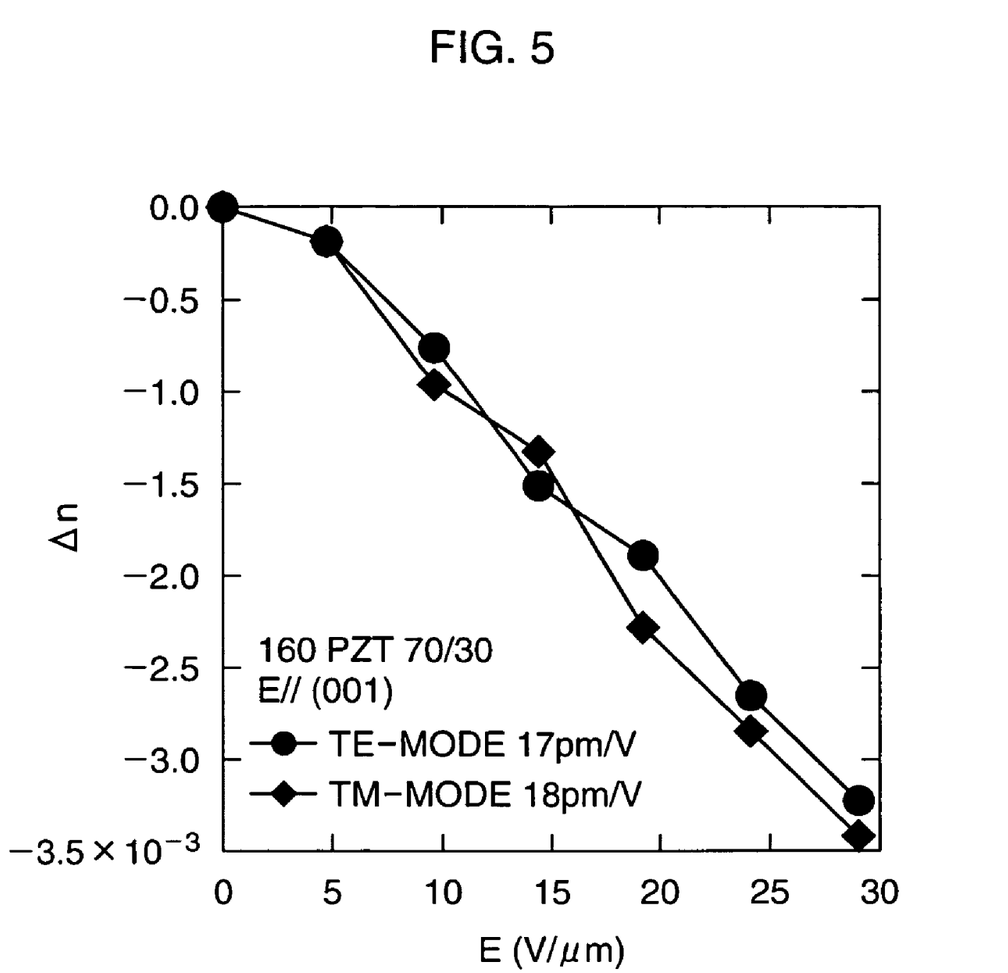
FIG. 5 is a characteristic chart showing an optical characteristic in a single layer film whose core layer is comprised of a PLZT (0/30/70) composition and which has domains of a single kind.

FIG. 5 shows an optical characteristic in a single layer film having domains of a single kind in which PLZT of the core layer 12 has this composition.

Here, variation amounts Δn in refractive indexes of the TE mode and the TM mode caused by the application of an electric field parallel with the (000) orientation were studied. As shown in the drawing, it was confirmed that the refractive indexes of the TE mode and the TM mode present almost the same change.

3. A case where the lower clad layer 11, the core layer 12, and the upper clad layer 13 are formed as films each comprised of an electro-optic material with a cubic crystal structure Materials with a cubic crystal structure are used as materials of the lower clad layer 11, the core layer 12, and the upper clad layer 13. Here, a PLZT (13/70/30) composition is used for the core layer 12 and a PLZT (14/80/20) composition is used for the lower and upper clad layers 11, 13. PLZT with each of these compositions presents a substantially cubic crystal at room temperature. A method of preparing a sol-gel solution for PLZT is the same as that described above.

For forming the core layer 12 with the PLZT (13/70/30) composition, a mol ratio of Pb (CH$_3$COO)$_2$. 3H$_2$O/La (i-OC$_3$H$_7$)$_3$ is set to 97/13 and a mol ratio of Zr(Oc$_3$H$_7$) 4/Ti (i-OC$_3$H$_7$)$_4$ is set to 70/30. The substrate 1 is coated with this sol-gel solution by spin coating, and calcination at 350° C. and sintering at 750° C. are performed in an oxygen atmosphere. The coating, calcining, and sintering processes are repeated until the core layer 12 has a desired film thickness, here about 5 μm.

For forming the lower and upper clad layers 11, 13 with the PLZT (14/80/20) composition, a mol ratio of Pb(CH$_3$COO)$_2$.3H$_2$O/La(i-OC$_3$H$_7$)$_3$ is set to 96/14 and a mol ratio of Zr(Oc$_3$H$_7$)$_4$/Ti(i-OC$_3$H$_7$)$_4$ is set to 80/20. The substrate 1 is coated with this sol-gel solution by spin coating, and calcination at 350° C. and sintering at 750° C. are performed in an oxygen atmosphere. The coating, calcining, and sintering processes are repeated until the lower and upper layers 11, 13 both have a desired film thickness, here about 3 μm.

Figure 6:
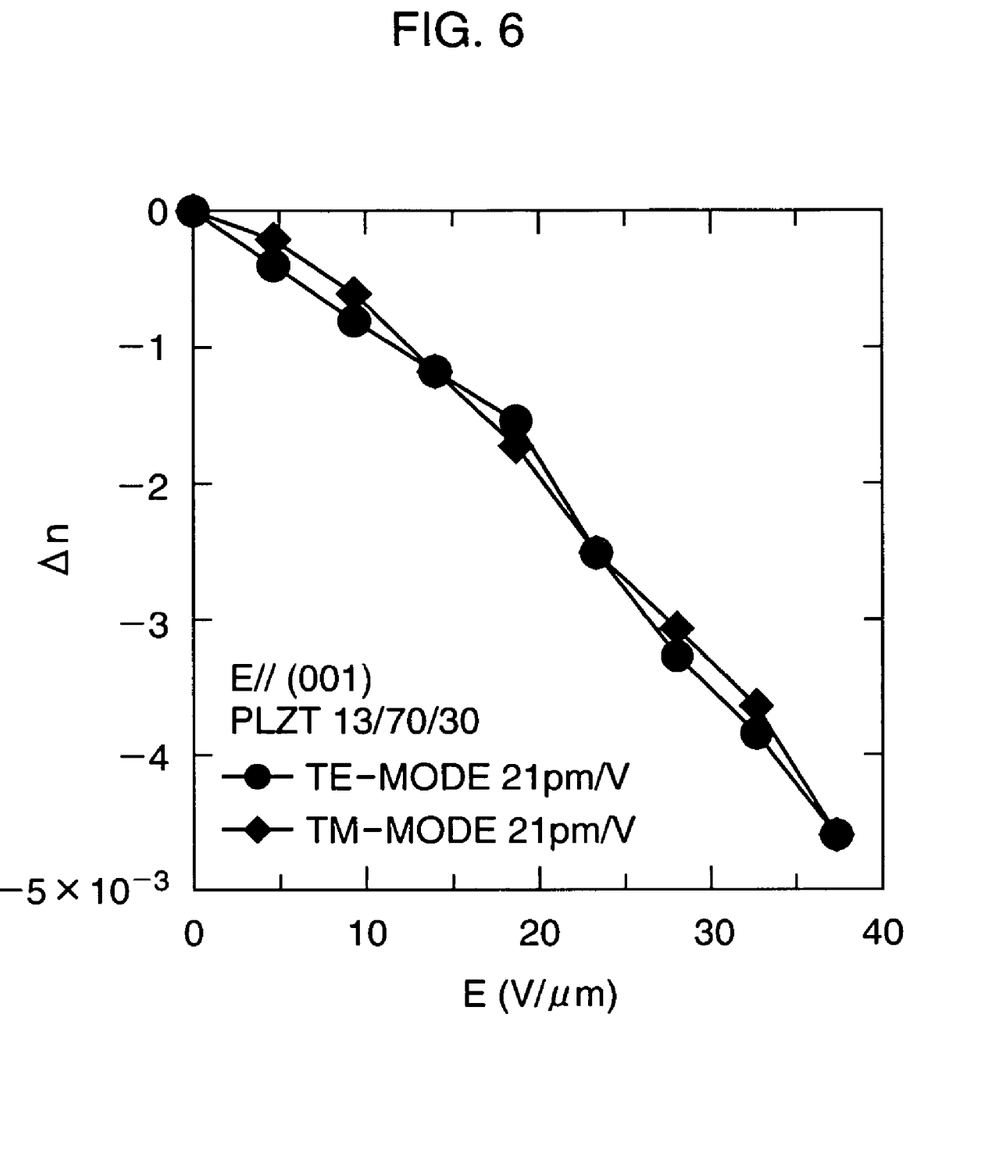
FIG. 6 is a characteristic chart showing an optical characteristic in a single layer film in which the core layer is comprised of a PLZT (13/70/30) composition.
Figure 7:
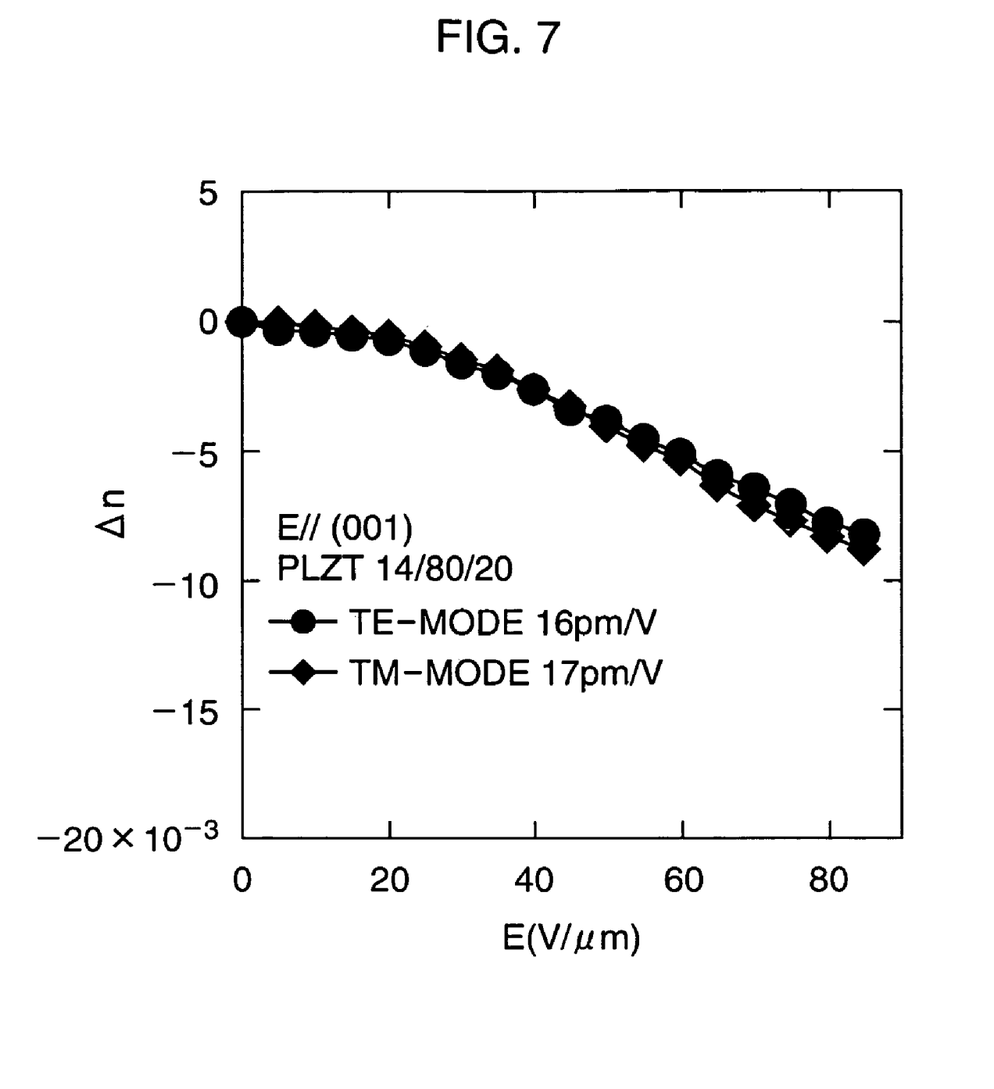
FIG. 7 is a characteristic chart showing an optical characteristic in a single layer film in which an upper and a lower clad layer are comprised of PLZT (14/80/20) compositions.

FIG. 6 shows an optical characteristic in a single layer film in which the core layer 12 is comprised of the PLZT (13/70/30) composition, and FIG. 7 shows an optical characteristic in a single layer film in which the lower and upper clad layers 11, 13 are comprised of the PLZT (14/80/20) compositions.

Here, variation amounts Δn in refractive indexes of the TE mode and the TM mode caused by the application of an electric field parallel with the (000) orientation were studied. As shown in FIG. 6 and FIG. 7, it was confirmed that the refractive indexes of the TE mode and the TM mode present almost the same change.

Subsequently, the deflection electrode 4 is formed on the upper clad layer 13.

Specifically, as shown in FIG. 4C, for example, a Cu/W film is mask-deposited in a triangular shape on the upper clad layer 13 to form the deflection electrode 4.

Through the foregoing processes, the light deflector of this embodiment is completed.

The following is the result when the optical waveguide 3 was formed so as to satisfy the condition 1 in the light deflector of this embodiment. Assuming that a ratio of the refractive indexes of the TM mode and the TE mode is defined as an expression (4), where n$_{TM}$ is the refractive index of the TM mode and n$_{TE}$ is the refractive index of the TE mode, the ratio of refractive indexes of the TM mode and the TE mode resulted in an extremely small value of 0.03%.

$$\text{refractive index ratio} = |(n_{TM} - n_{TE})/n_{TM}| \quad (4)$$

Further, assuming that a ratio of polarization dependencies of electro-optic effects of the TM mode and the TE mode is defined as an expression (5), where r$_{13}$ is the electro-optic effect of the TE mode and r$_{33}$ is the electro-optic effect of the TM mode, this polarization dependency ratio resulted in an extremely small value of 1.0%.

$$\text{polarization dependency ratio} = |(r_{33} - r_{13})/r_{33}| \quad (5)$$

Further, when the optical waveguide 3 is formed to satisfy the condition b 2, the refractive index ratio and the polarization dependency ratio both resulted in extremely small values of 0.2% and 1.5% respectively.

Further, when the optical waveguide 3 is formed to satisfy the condition 3, the refractive index ratio and the polarization dependency ratio both resulted in extremely small values of 0.01% and 0.5% respectively.

As has been described above, this embodiment realizes a light deflector that utilizes an electro-optic effect to easily and surely achieve high-speed driving, with an extremely simple structure and without causing any characteristic deterioration such as optical loss and that can be further downsized.

Second Embodiment

This embodiment discloses a concrete structure of an optical switch to which the present invention is applied.

Figure 8A:
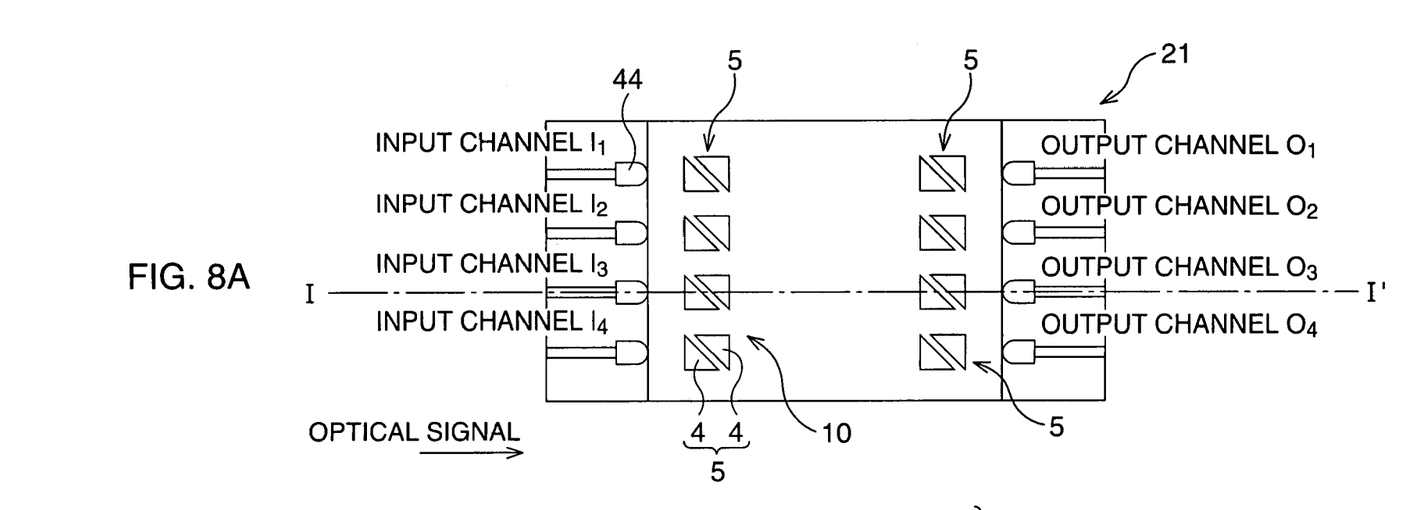
FIG. 8A and FIG. 8B are schematic views showing a rough structure of an optical switch according to a second embodiment.
Figure 8B:
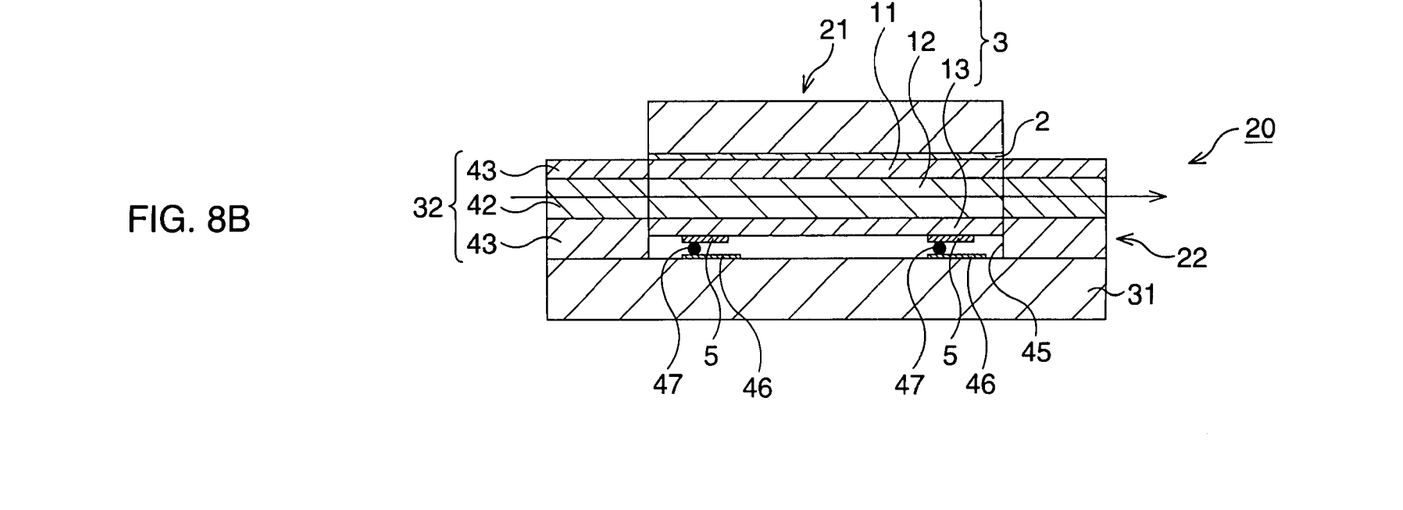

FIG. 8A and FIG. 8B are schematic views showing a rough structure of an optical switch according to the second embodiment. FIG. 8A is a schematic plane view showing only a main constituent portion of the optical switch and FIG.

8B is a schematic cross-sectional view of the optical switch taken along the I-I chain line in FIG. 8A. The same reference numerals or symbols are used to designate the same constituent members and the like as those of the first embodiment, and detailed description thereof will be omitted.

An optical switch 20 of this embodiment is structured such that the plural light deflectors 10 according to the first embodiment are arranged in parallel.

This optical switch 20 is an optical switch with an N×N (N: an integer equal to or larger than 2, and N=4 in the example in the drawing) arrangement, and it includes a main constituent portion 21 including a light deflecting mechanism and a channel formation portion 22 in which the main constituent portion 21 is disposed.

The channel formation portion 22 includes a channel waveguide 32 formed on a channel substrate 31.

The channel waveguide 32 is structured such that a lower clad layer 41 and an upper clad layer 43 sandwich a core layer 42 in which an optical path is formed, and includes input channels $I_1$ to $I_4$ and output channels $O_1$ to $O_4$ of an optical signal. Each of the input channels $I_1$ to $I_4$ has at its front end a microlens 44 collimating signal light, and the microlenses 44 are arranged in parallel at equal intervals. Similarly, each of the output channels $O_1$ to $O_4$ has at its back end a microlens 44, and the microlenses 44 are arranged in parallel at equal intervals. In the channel waveguide 32, a groove 45 in which the main constituent portion 21 is mounted is formed, and various wiring layers 46 are pattern-formed on portions of the surface of the channel substrate 31 exposed to a bottom portion of the groove 45.

In the channel formation portion 22, a $SiO_2$ film with a film thickness of about 5 μm is formed by thermally oxidizing the surface of the channel substrate 31 comprised of, for example Si, and thereafter, the $SiO_2$ film to about 3 μm depth from the surface thereof is doped with, for example, Ga, thereby forming the lower clad layer 41 with a film thickness of about 2 μm and the core layer 42 with a film thickness of about 2 μm. Thereafter, a $SiO_2$ film with a film thickness of about 2 μm is formed on the core layer 42 by a sol-gel method, a sputtering method, or the like to form the upper clad layer 43. Then, for example, $CF_4$ gas is used as etching gas to dry-etch the upper clad layer 43, the core layer 42, and the lower clad layer 41 to pattern-form the groove 45.

Substantially, the main constituent portion 21 of the optical switch 20 is structured such that the light deflectors 10 of the first embodiment are disposed to correspond to the input channels $I_1$ to $I_4$ and the output channels $O_1$ to $O_4$ respectively, with the optical waveguide 3 common thereto.

Each of the light deflectors 10 is structured such that an optical waveguide 3 is disposed above an element substrate 1 via a stress-relief layer 2, and a prism electrode 5 composed of a pair of deflection electrodes 4 is disposed on the waveguide 3. That is, the main constituent portion 21 is structured such that the prism electrodes 5 are disposed on the optical waveguide 3 to correspond to the input channels $I_1$ to $I_4$ and the output channels $O_1$ to $O_4$ respectively. Here, the plural prism electrodes 5 in each of the input channels $I_1$ to $I_4$ may be arranged in series in multi-tiers, and accordingly, the plural prism electrodes 4 may be arranged in each of the output channels $O_1$ to $O_4$ in multi-tiers. In this case, a large deflection angle can be obtained according to the number of the prism electrodes 5 disposed in each of the channels.

Here, the optical waveguide 3 is formed so that a layer including at least the core layer 12 of the optical waveguide 3 satisfies one of the following conditions 1 to 3, which are described previously, as in the first embodiment.

1. a film comprised of an electro-optic material with a rhombohedral structure and grown to have (100) crystal orientation 2. a film having domains of a single kind and comprised of an electro-optic material with a pseudo-cubic crystal structure 3. a film comprised of an electro-optic material with a cubic crystal structure As shown in FIG. 8B, the main constituent portion 21 as structured above is fitted in the groove 45 of the channel waveguide 32, with an upper and a lower face thereof being reversed, so that the positions of the waveguide 3 and the channel waveguide 32 match each other, and the prism electrodes 5 are connected to the predetermined wiring layers 46 by, for example, solder balls 47 respectively.

Figure 9:
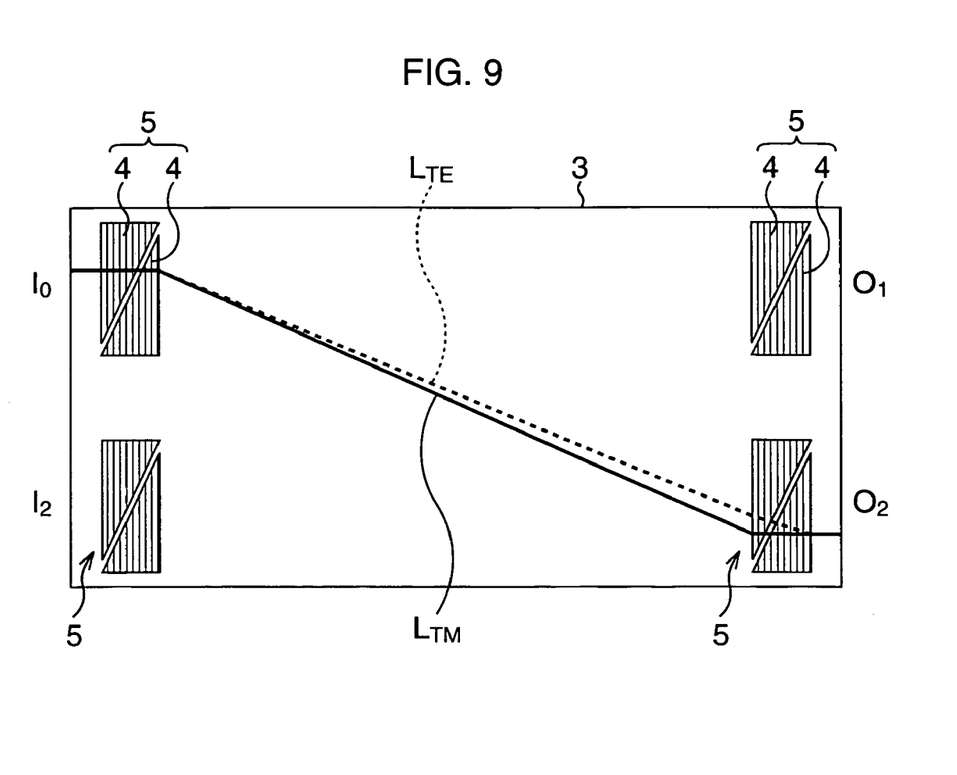
FIG. 9 is a schematic cross-sectional view showing operations of the optical switch.

Operations of this optical switch 20 will be described.

FIG. 9 is a schematic cross-sectional view showing operations of the optical switch 20. Here, for descriptive convenience, only the 2×2 arrangement of the input channels $I_1$, $I_2$ and the output channels $O_1$, $O_2$ is shown. Further, the solid line $L_{TM}$ and the dotted line $L_{TE}$ represent a TM mode component and a TE mode component of signal light respectively.

Incident light that has passed through the input channel $I_1$ is incident on the prism electrode 5. A predetermined voltage has been applied between the prism electrode 5 and a counter electrode layer 2. This voltage application causes a prismatic change in refractive index in the optical waveguide 3, so that the incident light is deflected either to left or to right by a very small angle to travel in a direction of, for example, the output channel $O_2$ as signal light. As shown in the drawing, in the optical switch 20, the refractive index and the electro-optic effect are substantially polarization independent, so that substantially no difference in a light traveling state is recognized between the TM mode component and the TE mode component of the signal light. Therefore, the light traveling states thereof can be recognized as the same. Then, the signal light is incident on the prism electrode 5 disposed in front of a predetermined output channel, for example, the output channel $O_2$, and is subjected to deflection correction similarly to the incident light. Then, the signal light is outputted from the output channel $O_2$.

Here, as a comparative example of this embodiment, a main constituent portion of an optical switch disclosed in the patent document 1 will be described, using FIG. 10. Here, for descriptive convenience, only the 2×2 arrangement of input channels $I_1$, $I_2$ and output channels $O_1$, $O_2$ is shown.

This main constituent portion is structured such that a pair of prism electrodes 102, 103 corresponding to each of the input channels $I_1$, $I_2$ and output channels $O_1$, $O_2$ (the structure of each of the prism electrodes is the same as that of the prism electrode 5) is disposed on an optical waveguide 101 formed on a substrate (not shown) and exhibiting an electro-optic effect, and each ½ wave plate 104 is inserted between the prism electrodes 102, 103. Note that in the example shown in the drawing, a ½ wave plate 104 common to the input channels $I_1$, $I_2$ and that common to the output channels $O_1$, $O_2$ are provided. Here, the solid line $L_{TM}$ and the dotted line $L_{TE}$ also represent a TM mode component and a TE mode component of signal light respectively.

Figure 10:
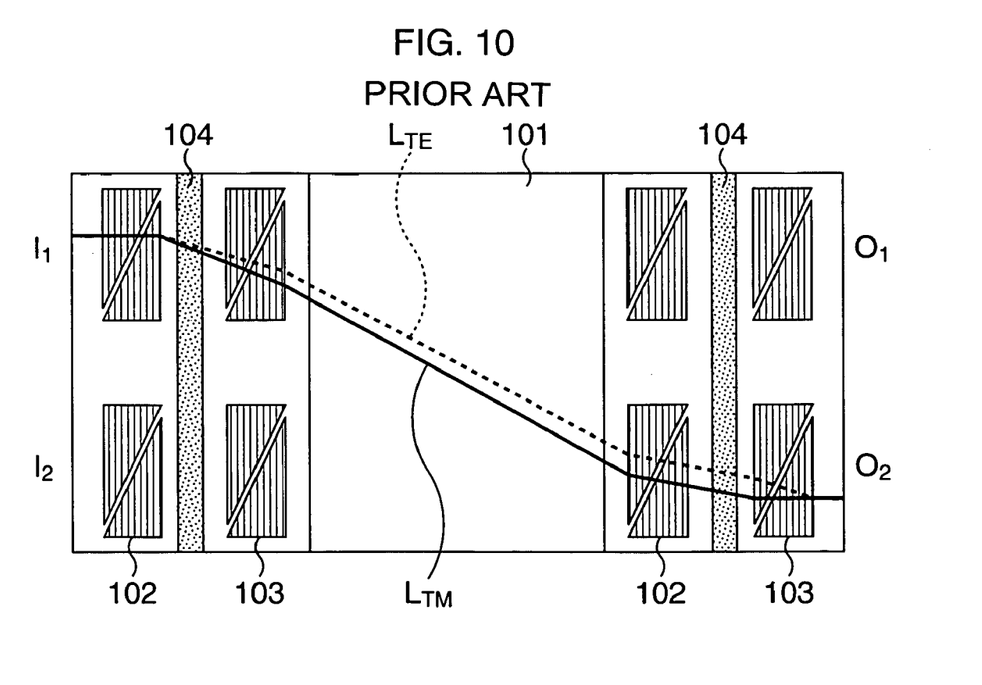
FIG. 10 is a schematic plane view showing an essential structure of an optical switch disclosed in the patent document 1.

In the optical switch in FIG. 10, the ½ wave plates 104 are used to rotate the polarization direction of light to replace the TE mode component and the TM mode component with each other. This naturally necessitates a pair of prism electrodes 102, 103 per sheet of the ½ wave plate 104 both on the input side and the output side, which results in a complicated and larger device compared with the optical switch 20 of this embodiment. On the other hand, the optical switch 20 of this embodiment does not require a ½ wave plate or additional prism electrodes corresponding thereto, which realizes a simpler and smaller device.

It should be noted that the present invention is not limited to the embodiments described above. For example, the light deflector is applicable not only to an optical switch but also to a laser printer, a barcode reader, and so on.

As has been described hitherto, this embodiment realizes an optical switch 20 that utilizes an electro-optic effect to easily and surely achieve high-speed driving, with an extremely simple structure and without causing any characteristic deterioration such as optical loss and that can be further downsized.

The present invention realizes an optical element that utilizes an electro-optic effect to easily and surely achieve high-speed driving, with an extremely simple structure and without causing any characteristic deterioration such as optical loss and that can be further downsized, and an optical switch to which this optical element is applied.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An optical element comprising:
   a substrate; and
   at least one layer of an electro-optic effect film formed above said substrate and having an electro-optic effect,
   wherein said electro-optic effect film has at least one polarization axis, and all the polarization axes are the same to a TE mode component of incident light and are the same to a TM mode component of the incident light,
   wherein said electro-optic effect film has domains of at least one kind, and all the polarization axes of the domains are the same to the TE mode component of the incident light and are the same to the TM mode component of the incident light, and
   wherein said electro-optic effect film is comprised of an electro-optic material with a rhombohedral structure, and the electro-optic material is grown in a (100) direction.

2. The optical element according to claim 1, wherein said electro-optic effect film is grown above said substrate with (100) crystal orientation on a major face.

3. An optical element comprising:
   a substrate; and
   at least one layer of an electro-optic effect film formed above said substrate and having an electro-optic effect,
   wherein said electro-optic effect film is comprised of an electro-optic material with a cubic crystal structure, and
   wherein said substrate is comprised of a material whose major component is $SrRiO_3$.

4. An optical switch comprising:
   an optical waveguide including at least one layer of an electro-optic effect film;
   a plurality of input channels formed in parallel at one end on said optical waveguide to receive an optical signal;
   first light deflectors provided for said respective input channels;
   a plurality of output channels formed in parallel at the other end on said optical waveguide to output the optical signal; and
   second light deflectors provided for said respective output channels,
   wherein the electro-optic effect film has at least one polarization axis and all the polarization axes are the same to a TE mode component of incident light and are the same to a TM mode component of the incident light,
   wherein the electro-optic effect film has domains of at least one kind, and all the polarization axes of the domains are the same to the TE mode component of the incident light and are the same to the TM mode component of the incident light, and
   wherein the electro-optic effect film is comprised of an electro-optic material with a rhombohedral structure, and the electro-optic material is grown in a (100) direction.

5. An optical element comprising:
   a substrate;
   a stress-relief layer composed of a metal material on the substrate; and
   at least one layer of an electro-optic effect film formed above said substrate and having an electro-optic effect,
   wherein said electro-optic effect film has at least one polarization axis, and all the polarization axes are the same to a TE mode component of incident light and are the same to a TM mode component of the incident light,
   wherein said electro-optic effect film has domains of at least one kind, and all the polarization axes of the domains are the same to the TE mode component of the incident light and are the same to the TM mode component of the incident light.

* * * * *